(No Model.)

W. SECK & M. FALK.
LUBRICATOR.

No. 364,378. Patented June 7, 1887.

WITNESSES:

INVENTORS
Wilhelm Seck and
Max Falk
BY
ATTORNEYS.

United States Patent Office.

WILHELM SECK, OF BOCKENHEIM, AND MAX FALK, OF DARMSTADT, GERMANY, ASSIGNORS TO SAID MAX FALK.

LUBRICATOR.

SPECIFICATION forming part of Letters Patent No. 364,378, dated June 7, 1887.

Application filed December 9, 1886. Serial No. 221,058. (No model.) Patented in Belgium November 15, 1886, No. 75,036; in Germany February 12, 1887, No. 39,575; in Austria-Hungary March 1, 1887, No. 42,686 and No. 8,777, and in France March 3, 1887, No. 179,358.

*To all whom it may concern:*

Be it known that we, WILHELM SECK, of Bockenheim, near Frankfort-on-the-Main, and MAX FALK, of Darmstadt, in the Kingdom of Prussia, Empire of Germany, have invented certain new and useful Improvements in Lubricators for Solid and Fluid Grease, (which has heretofore been patented to us in the following countries: By the government of Belgium, dated November 15, 1886, No. 75,036B; France, March 3, 1887, No. 179,358; Germany, February 12, 1887, No. 39,575, and Austria-Hungary, No. 42,686 and No. 8,777, March 1, 1887,) of which the following is a specification.

The object of my invention is to provide a new and improved lubricating apparatus for solid lubricants—such as, fat, grease, &c.— which apparatus is simple in construction and at all times shows to what extent the same is filled with the lubricant.

The invention consists in a cylindrical casing having a bottom neck and a screw-thread on its outer side, a piston in said casing, and spring-arms fastened to the piston and having their ends bent over to engage the screw-thread, whereby, by turning the spring arms, the piston is moved up and down in the casing, as will be fully described and set forth hereinafter, and finally be pointed out in the claim.

Figure 1:
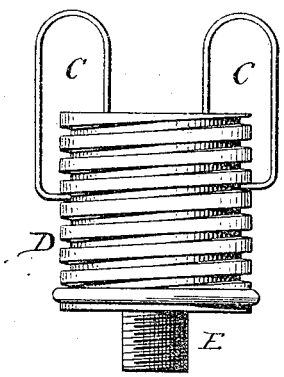
Figure 2:
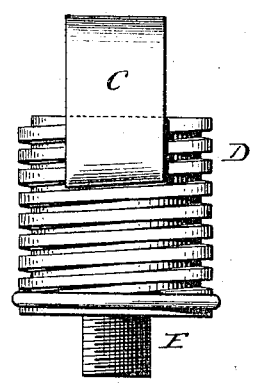
Figure 3:
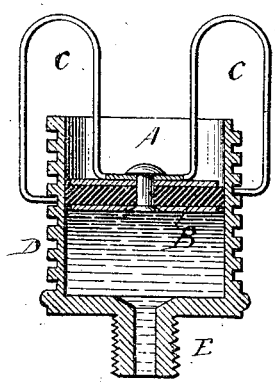
Figure 4:
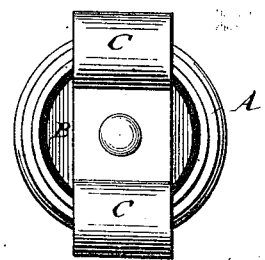

In the accompanying drawings, Figure 1 is a front view of my improved lubricating device. Fig. 2 is a side view of the same. Fig. 3 is a cross-sectional view of the same, and Fig. 4 is a top view of the same.

Similar letters of reference indicate corresponding parts.

The cylindrical casing A is provided with a bottom neck, E, which can be inserted into a cylindrical cross head or any other part of the machinery to be lubricated, said neck being screw-threaded externally. The cylindrical casing A is provided on its exterior surface with a screw-thread D, as shown. The piston B, made of rubber, leather, cloth, or other material, fits closely in the casing, and preferably has metal plates secured to its upper and lower surface. Two spring-arms, C, are fastened by a rivet or other suitable device on the piston, project upward from the same and are then curved and bent downward on the outside of the casing, and their ends are bent toward the outside of the casing and engage with the screw-thread. By turning the spring-arms C, the same are caused to travel up and down the outside of the casing, and as they are connected with the piston the same also is moved up and down.

The casing is filled with a suitable lubricant, preferably solid—such as fat or grease—and the piston is placed on the top of the same and turned, the bent ends of the spring arms entering the exterior thread. By turning the arms to the right the bent ends of the spring-arms travel along the thread and gradually move downward, whereby the piston is also moved downward and forces the lubricating material out through the neck in the bottom of the casing. As the spring-arms project a greater distance from the top of the casing when the said casing is filled than when it is empty, the position of said arms at all times shows the quantity of lubricating material in the casing.

The above-mentioned device is simple in construction and effective in use.

Having thus described our invention, we claim as new and desire to secure by Letters Patent—

In a lubricating device, the combination, with an exterior screw-threaded casing, of a piston in the casing, spring-arms connected to the piston and projecting upward therefrom, and then bent downward and having their ends bent toward the outside of the casing, the ends of the arms engaging with the screw-thread on the casing, substantially as shown and described.

In testimony that we claim the foregoing as our invention we have signed our names in presence of two subscribing witnesses.

WM. SECK.
MAX FALK.

Witnesses:
ALVESTO S. HOGUE,
JEAN GRUND.